US009529467B2

(12) United States Patent
Yang

(10) Patent No.: US 9,529,467 B2
(45) Date of Patent: Dec. 27, 2016

(54) TOUCH DISPLAY CIRCUIT, DRIVING METHOD THEREOF, ARRAY SUBSTRATE AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Shengji Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 325 days.

(21) Appl. No.: 14/350,473

(22) PCT Filed: Jul. 2, 2013

(86) PCT No.: PCT/CN2013/078708
§ 371 (c)(1),
(2) Date: Apr. 8, 2014

(87) PCT Pub. No.: WO2014/169535
PCT Pub. Date: Oct. 23, 2014

(65) Prior Publication Data
US 2016/0179256 A1 Jun. 23, 2016

(30) Foreign Application Priority Data

Apr. 18, 2013 (CN) .......................... 2013 1 0135892

(51) Int. Cl.
G06F 3/041 (2006.01)
G09G 3/32 (2016.01)
G06F 3/044 (2006.01)

(52) U.S. Cl.
CPC .......... *G06F 3/0412* (2013.01); *G06F 3/0416* (2013.01); *G09G 3/3208* (2013.01);
(Continued)

(58) Field of Classification Search
CPC ...... G06F 3/044; G06F 3/0412; G06F 3/0416; G09G 3/3208; G09G 3/3275; G09G 3/3225; G09G 3/3266
See application file for complete search history.

(56) References Cited

U.S. PATENT DOCUMENTS 9,122,339 B2 * 9/2015 Yang .................. G06F 3/0416
9,330,600 B2 * 5/2016 Tan .................... G09G 3/3258
(Continued)

FOREIGN PATENT DOCUMENTS

CN 102483659 A 5/2012
CN 102682705 A 9/2012
(Continued)

OTHER PUBLICATIONS

Written Opinion of the International Searching Authority dated Jan. 17, 2014; PCT/CN2013/078708.
(Continued)

*Primary Examiner* — Rodney Amadiz
(74) *Attorney, Agent, or Firm* — Ladas & Parry LLP

(57) ABSTRACT

The present disclosure discloses a touch display circuit, a driving method thereof, an array substrate and a display apparatus, which are capable of reducing a process during a production procedure of a touch display product, saving a cost while increasing an aperture ratio of the produce and added values. The touch display circuit includes: a touch unit and a display unit which are connected with each other; a first scan line, a second scan line, a third scan line, a signal control line, a data line, a first level terminal and a second level terminal, which are connected with the display unit;

(Continued)

and the second scan line, the third scan line and a signal collecting line, which are connected with the touch unit. Embodiments of the present disclosure may be applied to a manufacture of a display.

17 Claims, 4 Drawing Sheets

(52) U.S. Cl.
CPC ......... *G09G 3/3225* (2013.01); *G09G 3/3266* (2013.01); *G09G 3/3275* (2013.01); *G06F 3/044* (2013.01)

(56) References Cited

U.S. PATENT DOCUMENTS

| | | | |
|---|---|---|---|
| 9,330,604 B2* | 5/2016 | Zhou | G09G 3/3266 |
| 2005/0094038 A1 | 5/2005 | Choi et al. | |
| 2009/0135158 A1 | 5/2009 | Takahashi et al. | |
| 2010/0097391 A1 | 4/2010 | Ahn et al. | |
| 2011/0050585 A1 | 3/2011 | Hotelling et al. | |
| 2011/0273397 A1 | 11/2011 | Hanari | |
| 2014/0168157 A1 | 6/2014 | Yang | |
| 2015/0002414 A1* | 1/2015 | Tan | G06F 3/044 345/173 |
| 2015/0049046 A1* | 2/2015 | Tan | G06F 3/0412 345/174 |
| 2015/0193045 A1* | 7/2015 | Zhou | G09G 3/3233 345/174 |
| 2015/0220186 A1* | 8/2015 | Tan | G06F 3/0412 345/174 |
| 2015/0268763 A1* | 9/2015 | Zhou | G06F 3/0412 345/174 |
| 2015/0301674 A1* | 10/2015 | Tan | G06F 3/042 345/173 |
| 2015/0378470 A1* | 12/2015 | Yang | G06F 3/0416 345/174 |

FOREIGN PATENT DOCUMENTS

| | | |
|---|---|---|
| CN | 103034365 A | 4/2013 |
| EP | 1422601 A1 | 5/2004 |
| EP | 2746903 A2 | 6/2014 |
| KR | 20100042899 A | 4/2010 |

OTHER PUBLICATIONS

Chinese Patent Certificate issued Mar. 30, 2016; ZL 2013 1 0135892.1.
Korean Notice of Allowance dated May 16, 2016; Appln. No. 10-2014-7010575.
Extended European Search Report dated Oct. 19, 2016: Appln. No. 13843020.2-1903 /2988195 PCT/CN2013078708.

* cited by examiner

TOUCH DISPLAY CIRCUIT, DRIVING METHOD THEREOF, ARRAY SUBSTRATE AND DISPLAY APPARATUS

TECHNICAL FIELD

The present disclosure relates to a field of display technique, and particularly to a touch display circuit, a driving method thereof, an array substrate and a display apparatus.

BACKGROUND

An Active Matrix Organic Light Emitting Diode (AMOLED) has been one of hotspots in a research of current panel display, and an Organic Light-Emitting Diode (OLED) has advantages of a low power consumption, a low production cost, a capability of self-luminizing, a wide angle of view, a rapid response speed, etc, as compared with a liquid crystal display. Currently, the OLED has started to replace a traditional Liquid Crystal Display (LCD) panel in display fields such as a mobile phone, a Personal Digital Assistant (PDA), a digital camera and the like. Recently, an In Cell Touch technique has been applied to the LCD display successfully, and most of large manufacturers have gone into mass production successfully. Because of limitations on the technique and a productivity, however, the In Cell Touch technique still can not replace an Add On (a technique for adding a capacitance film for touching on an light-exiting side of the display apparatus) product and an One Glass Solution (OGS) product totally in a large scale in the market. Further, a product in which the AMOLED and the In Cell Touch are combined is not very mature yet, and there are many problems in a process of such product, for example, its process is too complicated and an aperture ratio of the product is low.

SUMMARY

Embodiments of the present disclosure provide a touch display circuit, a driving method thereof, an array substrate and a display apparatus, which are capable of reducing a process during a production procedure of a touch display product, saving a cost while increasing an aperture ratio of the produce and added values.

In view of this, the embodiments of the present disclosure utilize solutions as follows.

In one aspect, there is provided a touch display circuit comprising a touch unit and a display unit which are connected with each other; a first scan line, a second scan line, a third scan line, a signal control line, a data line, a first level terminal and a second level terminal, which are connected with the display unit; and the second scan line, the third scan line and a signal collecting line, which are connected with the touch unit;

the display unit comprises a driving module and a light-emitting module;

the driving module is connected with the first scan line, the second scan line, the signal control line, the data line, the first level terminal and the touch unit;

the light-emitting module is connected with the driving module, the third scan line and the second level terminal; wherein the driving module provides a first level to the touch unit under controls of the first scan line, the second scan line, the signal control line and the data line; the touch unit outputs a first amplified signal acquired by amplifying the first level to the signal collecting line, or the touch unit outputs a second amplified signal to the signal collecting line as touched; the driving module provides a light-emitting signal to the light-emitting module through the first level terminal and the second level terminal under the controls of the first scan line, the second scan line, the signal control line and the data line; and the third scan line controls the light-emitting signal so as to drive the light-emitting module to emit light.

Optionally, the touch unit comprises a first switch transistor, a second switch transistor, a first capacitor and an amplifying transistor;

a gate of the first switch transistor is connected with the second scan line, and a source thereof is connected with the driving module of the display unit;

a gate of the amplifying transistor is connected with a drain of the first switch transistor, and a source of the amplifying transistor is connected with a first electrode of the first capacitor;

a second electrode of the first capacitor, as a touch electrode, is connected with the drain of the first switch transistor, and the first electrode of the first capacitor is connected with a ground terminal; and a gate of the second switch transistor is connected with the third scan line, a source of the second switch transistor is connected with a drain of the amplifying transistor, and a drain of the second switch transistor is connected with the signal collecting line.

Optionally, the driving module comprises a second capacitor, a driving transistor, a third switch transistor, a fourth switch transistor, a fifth switch transistor and a sixth switch transistor;

a gate of the third switch transistor is connected with the second scan line, and a source of the third switch transistor is connected with the first level terminal;

a gate of the fourth switch transistor is connected with the first scan line, and the source of the fourth switch transistor is connected with a drain of the third switch transistor;

a gate of the fifth switch transistor is connected with the first scan line, a source of the fifth switch transistor is connected with the data line, and a drain of the fifth switch transistor is connected with the touch unit;

a first electrode of the second capacitor is connected with the drain of the fifth switch transistor, and a second electrode of the second capacitor is connected with a drain of the fourth switch transistor;

a gate of the sixth switch transistor is connected with the signal control line, a source of the sixth switch transistor is connected with the first level terminal, and a drain of the sixth switch transistor is connected with the drain of the fifth switch transistor;

a gate of the driving transistor is connected with the second electrode of the second capacitor, and a source of the driving transistor is connected with the drain of the third switch transistor; and a drain of the driving transistor is connected with the light-emitting module, the first level terminal provides the light-emitting signal to the light-emitting module through the drain of the driving transistor and the second level terminal, and the third scan line controls the light-emitting signal so as to drive the light-emitting module to emit light.

Optionally, the light-emitting module comprises a seventh switch transistor and a light-emitting device;

a gate of the seventh switch transistor is connected with the third scan line, a source of the seventh switch transistor is connected with the driving module, and a drain of the seventh switch transistor is connected with the second level terminal; and one electrode of the light-emitting device is connected with the drain of the driving transistor, and the other electrode of the light-emitting device is connected with the second level terminal.

Optionally, the light-emitting module comprises a seventh switch transistor and a light-emitting device;

a gate of the seventh switch transistor is connected with the third scan line, and a source of the seventh switch transistor is connected with the driving module; and one electrode of the light-emitting device is connected with a drain of the seventh switch transistor, and the other electrode of the light-emitting device is connected with the second level terminal.

Optionally, all of the transistors in the touch display circuit are transistors with a same type.

In one aspect, there is provided a driving method for a touch display circuit, comprising:

in a first stage, a driving module provides a first level to a touch unit, and the touch unit outputs a first amplified signal acquired by amplifying the first level to the signal collecting line;

in a second stage, the touch unit is touched, and the touch unit outputs a second amplified signal to the signal collecting line;

in a third stage, the driving module stores an operation voltage; and in a fourth stage, the touch unit is suspended, and the driving module applies a light-emitting signal to a light-emitting module under the operation voltage.

Optionally, when the touch unit comprises a first switch transistor, a second switch transistor, a first capacitor and an amplifying transistor, the driving method further comprises:

in the first stage, the first switch transistor, the second switch transistor and the amplifying transistor of the touch unit are turned on, the driving module provides the first level to a source of the first switch transistor, a drain of the amplifying transistor outputs the first amplified signal to the signal collecting line through the second switch transistor;

in the second stage, the second switch transistor and the amplifying transistor of the touch unit are turned on, the first switch transistor is turned off, and the drain of the amplifying transistor outputs the second amplified signal to the signal collecting line through the second switch transistor when a second electrode of the first capacitor is touched;

in the third stage, the second switch transistor and the amplifying transistor of the touch unit are turned on, the first switch transistor is turned off, and the driving module stores the operation voltage; and in the fourth stage, the second switch transistor and the amplifying transistor of the touch unit are turned off, the first switch transistor is turned on, and the driving module applies the light-emitting signal to the light-emitting module.

Optionally, the driving module comprises a third switch transistor, a fourth switch transistor, a fifth switch transistor, a sixth switch transistor, a second capacitor and a driving transistor, the driving method further comprises:

in the first stage, the third switch transistor, the fourth switch transistor, the fifth switch transistor and the driving transistor of the driving module are turned on, the sixth switch transistor is turned off, the data line inputs a high level reset signal, and a first level terminal charges the second capacitor;

in the second stage, the fourth switch transistor, the fifth switch transistor and the driving transistor of the driving module are turned on, the third switch transistor and the sixth switch transistor are turned off, the second capacitor discharges until a voltage value at a second electrode of the second capacitor is equal to a threshold voltage of the driving transistor;

in the third stage, the sixth switch transistor and the driving transistor of the driving module are turned on, the third switch transistor, the fourth switch transistor and the fifth switch transistor are turned off, voltages at the two electrodes of the second capacitor jump equivalently, and the second capacitor stores the operation voltage; and in the fourth stage, the fourth switch transistor, the fifth switch transistor and the sixth switch transistor of the driving module are turned off, the third switch transistor is turned on, the second electrode of the second capacitor provides the operation voltage to the gate of the driving transistor so as to turn on the driving transistor, and the first level terminal and the second level terminal apply the light-emitting signal to the light-emitting module.

Optionally, the light-emitting module comprises a seventh switch transistor and a light-emitting device, and when a source and a drain of the seventh switch transistor are connected with two electrodes of the light-emitting device in parallel, the driving method further comprises:

the seventh switch transistor is turned on in the first stage;

the seventh switch transistor is turned on in the second stage;

the seventh switch transistor is turned on in the third stage; and the seventh switch transistor is turned off in the fourth stage, and the driving module provides the light-emitting signal to the light-emitting module through the first level terminal and the second level terminal.

Optionally, the light-emitting module comprises a seventh switch transistor and a light-emitting device, and when a source and a drain of the seventh switch transistor are connected with two electrodes of the light-emitting device in series, the driving method further comprises:

the seventh switch transistor is turned off in the first stage;

the seventh switch transistor is turned off in the second stage;

the seventh switch transistor is turned off in the third stage; and the seventh switch transistor is turned on in the fourth stage, and the driving module provides the light-emitting signal to the light-emitting module through the first level terminal and the second level terminal.

In one aspect, there is provided an array substrate comprising any one of the touch display circuits described above.

In one aspect, there is provided a display apparatus comprising the array substrate described above.

In the touch display circuit, the driving method thereof, the array substrate and the display apparatus according to the embodiments of the present disclosure, the circuit with a touch structure and the circuit of the display unit are integrated into together, therefore the touch structure according to the embodiments of the present disclosure may be manufactured simultaneously by the manufacture process for the display unit, which may reduce the process during the production procedure of the touch display product, saving the cost while increasing the aperture ratio of the produce and added values.

BRIEF DESCRIPTION OF THE DRAWINGS

In order to explain solutions in embodiments of the present disclosure or the prior art more clearly, drawings required as describing the embodiments of the present disclosure or the prior art will be introduced briefly below. Obviously, the drawings described below only some embodiments of the present disclosure, but those ordinary skilled in the art may obtain other drawings according to these drawings without any inventive labors.

DETAILED DESCRIPTION

Thereafter, solutions of embodiments of the present disclosure will be described clearly and completely in connection with drawings of the embodiments of the present disclosure, but obviously the described embodiments are only some, but not all of the embodiments of the present disclosure. Any other embodiments obtained by those ordinary skilled in the art based on the embodiments of the present disclosure without inventive labors should fall into a scope sought for protection in the present disclosure.

All of switch transistors, amplifying transistors and driving transistors utilized in all embodiments of the present disclosure may be thin film transistor or field effect transistors or any other devices with same characteristics, and because a source and a drain of the switch transistor utilized herein are symmetrical, the source and the drain may be exchanged. In the embodiments of the present disclosure, in order to distinguish two electrodes except for a gate of the transistor, one electrode therein is referred to as the source while the other electrode is referred to as the drain. According to a pattern shown in drawings, a middle terminal of the transistor is specified as the gate, a signal input terminal is specified as the source and a signal output terminal is specified as the drain. Further, the switch transistors utilized in the embodiments of the present disclosure comprise two types, that is, P-type switch transistors and N-type switch transistors, in which the P-type switch transistor is turned on as its gate is in a low level and is turned off as its gate is in a high level, while the N-type switch transistor is turned on as its gate is in the high level and is turned off as its gate is in the low level; the amplifying transistor and the driving transistor comprise a P-type and a N-type: in which the P-type amplifying transistor or driving transistor is in an amplifying state when its gate voltage is in the low level (the gate voltage is lower than a source voltage) and an absolute value of a voltage difference between the gate and the source is greater than a threshold voltage, during which an input voltage from the source may be amplified and output from the drain; in which the N-type amplifying transistor or driving transistor is in an amplifying state when its gate voltage is in the high level (the gate voltage is greater than the source voltage) and the absolute value of a voltage difference between the gate and the source is greater than the threshold voltage, during which the input voltage from the source may be amplified and output from the drain. Of course, the embodiments of the present disclosure only utilize the P-type amplifying transistor and the P-type driving transistor as an example.

Figure 1:
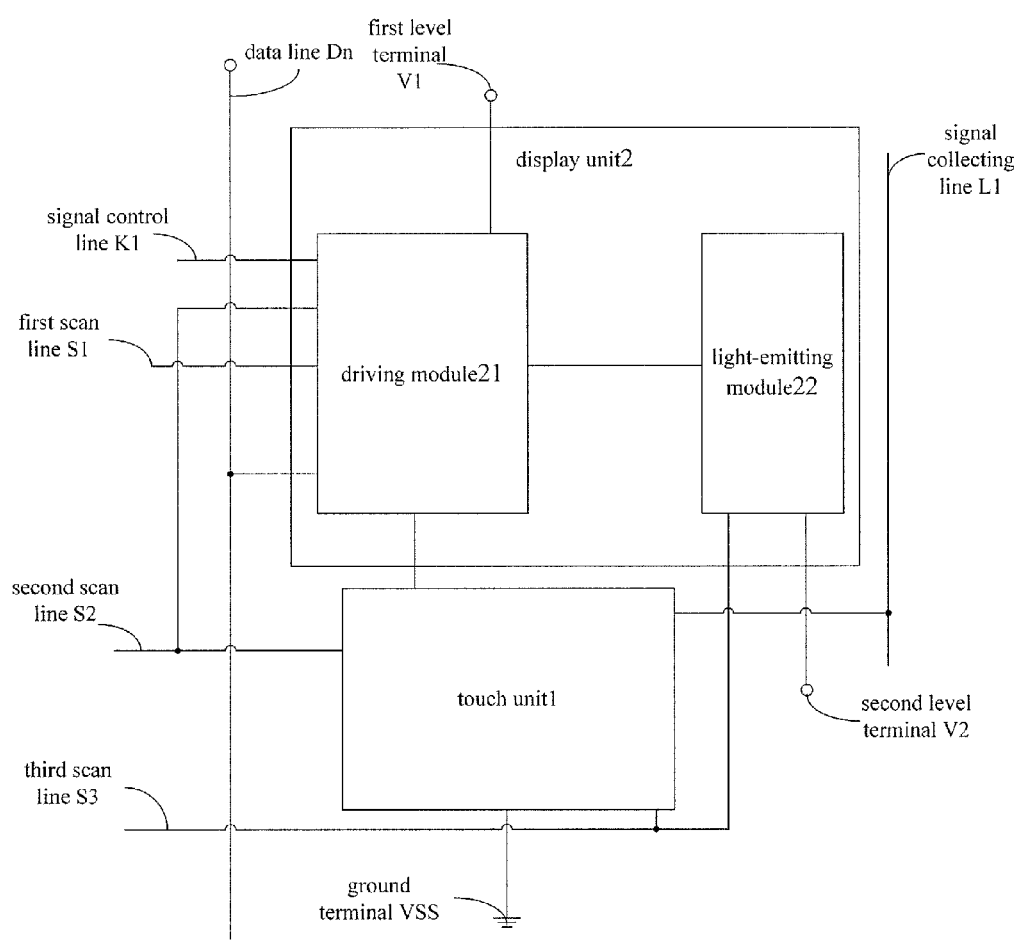
FIG. 1 is an exemplary view illustrating a structure of a touch display circuit according to an embodiment of the present disclosure.

Referring to FIG. 1, a touch display circuit comprises a touch unit 1 and a display unit 2 which are connected with each other;

a first scan line S1, a second scan line S2, a third scan line S3, a signal control line K1, a data line Dn, a first level terminal V1 and a second level terminal V2, which are connected with the display unit 2; and the second scan line S2, the third scan line S3 and a signal collecting line L1, which are connected with the touch unit 1;

the display unit 2 comprises a driving module 21 and a light-emitting module 22;

the driving module 21 is connected with the first scan line S1, the second scan line S2, the signal control line K1, the data line Dn, the first level terminal V1 and is also connected with the touch unit 1;

the light-emitting module 22 is connected with the driving module 21, the third scan line S3 and the second level terminal V2; in which the driving module 21 provides a first level to the touch unit 1 under controls of the first scan line S1, the second scan line S2, the signal control line K1 and the data line Dn; the touch unit 1 outputs a first amplified signal acquired by amplifying the first level to the signal collecting line L1, or the touch unit 1 outputs a second amplified signal to the signal collecting line L1 as touched; the driving module 21 provides a light-emitting signal to the light-emitting module 22 through the first level terminal V1 and the second level terminal V2 under the controls of the first scan line S1, the second scan line S2, the signal control line K1 and the data line Dn; and the third scan line S3 controls the light-emitting signal so as to drive the light-emitting module 22 to emit light.

Figure 2:
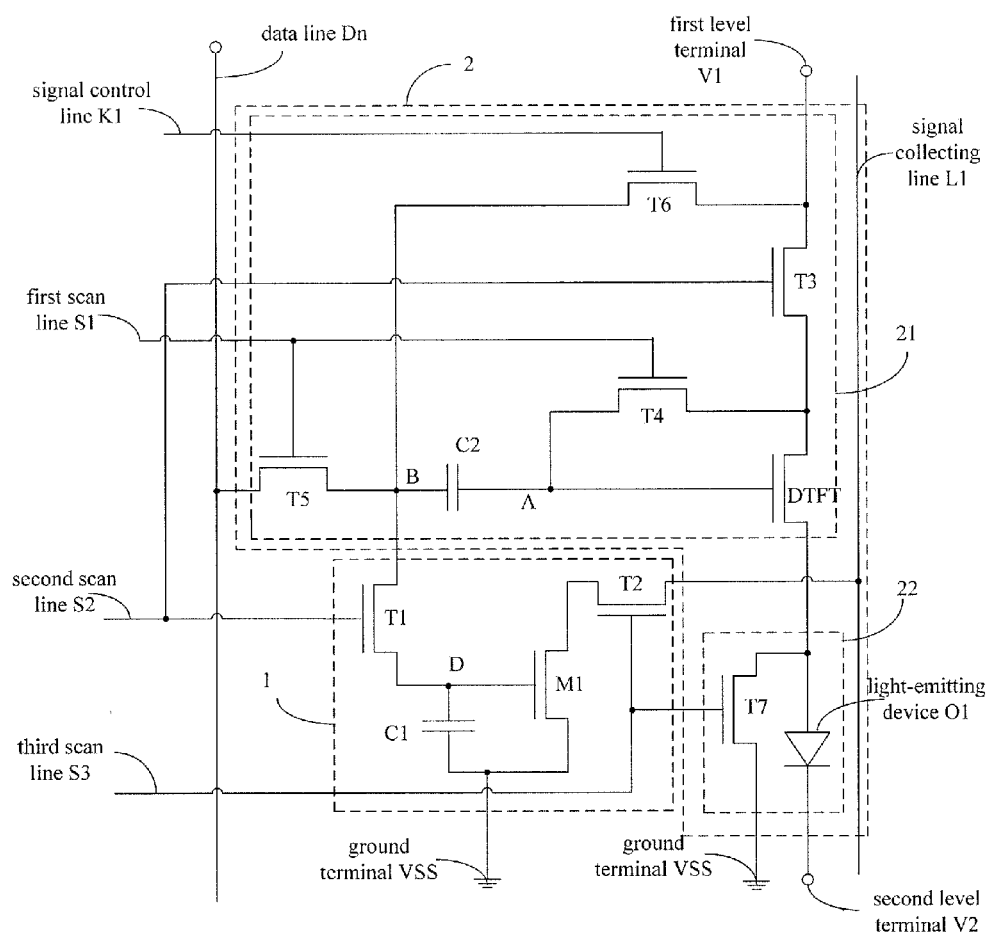
FIG. 2 is an exemplary view illustrating a structure of a touch display circuit according to another embodiment of the present disclosure.

Optionally, as illustrated in FIG. 2, the embodiments of the present disclosure provide an exemplary structure of the touch unit, in which the touch unit 1 comprises a first switch transistor T1, a second switch transistor T2, a first capacitor C1 and an amplifying transistor M1;

a gate of the first switch transistor T1 is connected with the second scan line S2, and a source thereof is connected with the driving module 21 of the display unit 2 (in FIGS. 1 and 2, it is implemented by connecting the source of the first switch transistor T1 to a drain of a fifth switch transistor T5);

a gate of the amplifying transistor M1 is connected with a drain of the first switch transistor T1, and a source of the amplifying transistor M1 is connected with a first electrode of the first capacitor C1;

a second electrode of the first capacitor C1, as a touch electrode, is connected with the drain of the first switch transistor T1, and the first electrode of the first capacitor C1 is connected with a ground terminal VSS; and a gate of the second switch transistor T2 is the third scan line S3, a source of the second switch transistor T2 is connected with a drain of the amplifying transistor M1, and a drain of the second switch transistor T2 is connected with the signal collecting line L1.

In an example, as illustrated in FIG. 2, the embodiments of the present disclosure provide an exemplary structure of the driving module:

the driving module 21 comprises a second capacitor C2, a driving transistor DTFT, a third switch transistor T3, a fourth switch transistor T4, a fifth switch transistor T5 and a sixth switch transistor T6;

a gate of the third switch transistor T3 is connected with the second scan line S2, and a source of the third switch transistor T3 is connected with the first level terminal V1;

a gate of the fourth switch transistor T4 is connected with the first scan line S1, and the source of the fourth switch transistor T4 is connected with a drain of the third switch transistor T3;

a gate of the fifth switch transistor T5 is connected with the first scan line S1, a source of the fifth switch transistor T5 is connected with the data line Dn, and a drain of the fifth switch transistor T5 is connected with the touch unit 1 (in FIGS. 1 and 2, it is implemented by connecting the drain of the fifth switch transistor T5 to the source of the first switch transistor T1);

a first electrode of the second capacitor C2 is connected with the drain of the fifth switch transistor T5, and a second electrode of the second capacitor C2 is connected with a drain of the fourth switch transistor T4;

a gate of the sixth switch transistor T6 is connected with the signal control line K1, a source of the sixth switch transistor T6 is connected with the first level terminal V1, and a drain of the sixth switch transistor T6 is connected with the drain of the fifth switch transistor T5;

a gate of the driving transistor DTFT is connected with the second electrode of the second capacitor C2, and a source of the driving transistor DTFT is connected with the drain of the third switch transistor T3; and a drain of the driving transistor DTFT is connected with the light-emitting module 22, the first level terminal V1 provides the light-emitting signal to the light-emitting module 22 through the drain of the driving transistor DTFT and the second level terminal V2, and the third scan line S3 controls the light-emitting signal so as to drive the light-emitting module 22 to emit light.

Optionally, referring to FIG. 2, the light-emitting module 22 comprises a seventh switch transistor T7 and a light-emitting device O1;

a gate of the seventh switch transistor T7 is connected with the third scan line S3, a source of the seventh switch transistor T7 is connected with the driving module 21 (in FIG. 2, it is implemented by connecting with the drain of the driving transistor DTFT of the driving module 21), and a drain of the seventh switch transistor T7 is connected with the second level terminal V2; and one electrode of the light-emitting device O1 is connected with the drain of the driving transistor DTFT, and the other electrode of the light-emitting device O1 is connected with the second level terminal V2.

Figure 3:
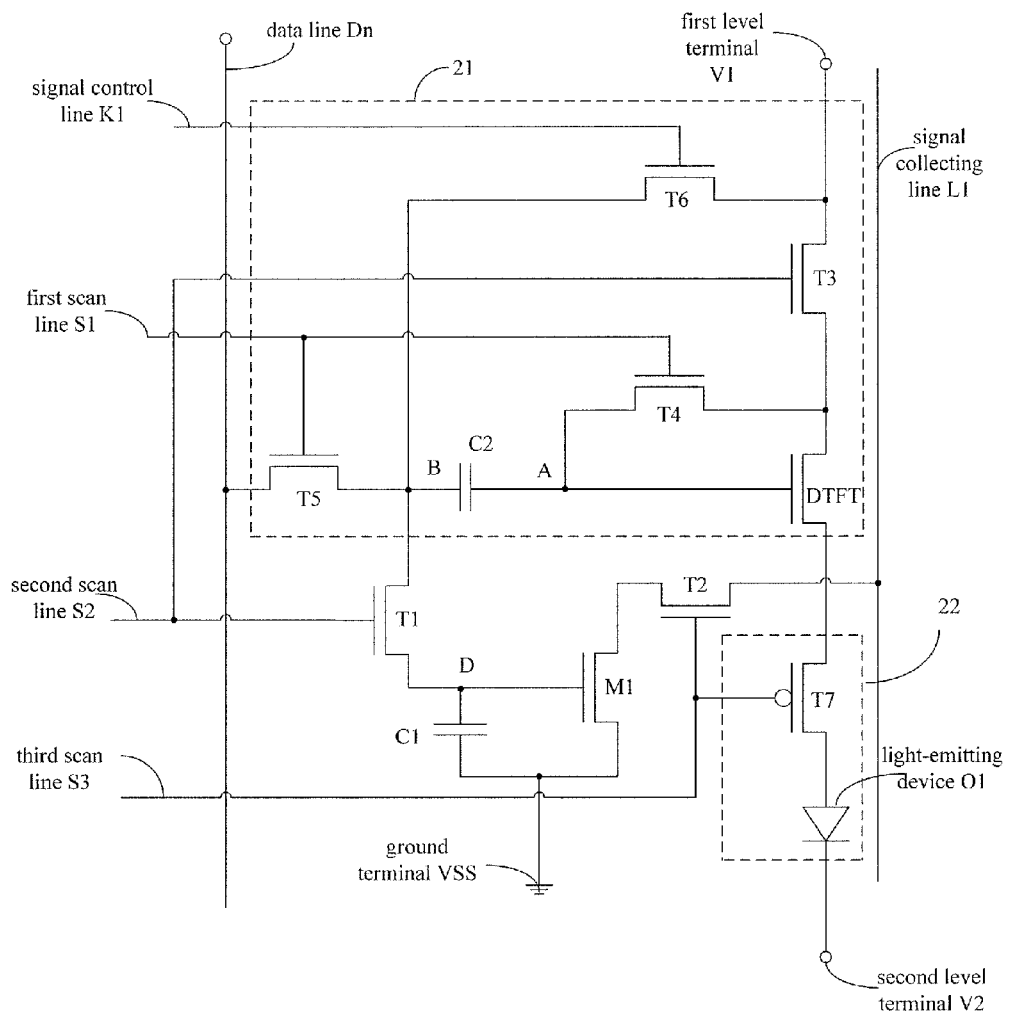
FIG. 3 is an exemplary view illustrating a structure of a touch display circuit according to a further embodiment of the present disclosure.

Optionally, as illustrated in FIG. 3, the light-emitting module 21 comprises a seventh switch transistor T7 and a light-emitting device O1;

a gate of the seventh switch transistor T7 is connected with the third scan line S3, and a source of the seventh switch transistor T7 is connected with the driving module (in FIG. 3, it is implemented by connecting with the drain of the driving transistor DTFT of the driving module 21); and one electrode of the light-emitting device O1 is connected with a drain of the seventh switch transistor T7, and the other electrode of the light-emitting device is connected with the second level terminal V2.

Of course the light-emitting devices O1 in FIGS. 2 and 3 may be an Active light-emitting diode (OLED). When the OLED is a bottom-emission type OLED, a level $V_2$ of the second level terminal V2 is lower than a level $V_1$ of the first level terminal V1; in an example, the low level is the ground terminal VSS. Of course FIGS. 2 and 3 take the bottom-emission type OLED as an example.

Further, all of the transistors in the touch display circuit may be transistors with a same type. In particularly, the first switch transistor T1, the second switch transistor T2, the third switch transistor T3, the fourth switch transistor T4, the fifth switch transistor T5, the sixth switch transistor T6, the driving transistor DTFT and the amplifying transistor M1 may be the transistors with the same type, herein may be the N-type transistors. At this time, if the light-emitting module 21 comprises the seventh switch transistor T7 and the light-emitting device O1 and the source, the drain of the seventh switch transistor T7 are connected with the two electrodes of the light-emitting device O1 in parallel, the switch transistor T7 may also be the N-type transistor. Thus, a consistency of the types of the respective transistors is also benefit to reduce the manufacture process and ensure a unity of component performances. Of course, when the light-emitting module 21 comprises the seventh switch transistor T7 and the light-emitting device O1 and the source, the drain of the seventh switch transistor T7 are connected with the two electrodes of the light-emitting device O1 in series, the seventh switch transistor T7 is required to be the P-type transistor.

No limitations are made to the types of the respective switch transistors described above, either the N-type or the P-type is applicable. FIG. 2 makes a description by taking a case in which all of the switch transistors are N-type as an example, but of course the type may be changed suitably, and the signals on the signal lines connected to the corresponding gates are needed to be adjusted after the types of the corresponding switch transistors are changed. Such variations should be considered as to fall into the scope sought for protection by the present disclosure.

In the touch display circuit according to the embodiments of the present disclosure, the circuit with a touch structure and the circuit of the display unit are integrated into together, therefore the touch structure according to the embodiments of the present disclosure may be manufactured simultaneously by the manufacture process for the display unit, which may reduce the process during the production procedure of the touch display product, saving the cost while increasing the aperture ratio of the produce and added values. In particularly, the embodiments of the present disclosure integrate the AMOLED driving circuit of the display unit together with the signal scan lines and data line (Vdata) required in the circuit with the In Cell Touch structure together, and realize an effective combination of the AMOLED display and the In Cell Touch function. Furthermore, the display unit may avoid an influence on a driving current of the active light-emitting device caused by a shift of the threshold voltage of the driving transistor in a manner of voltage compensation, which may in turn an uniformity of displayed image.

Referring to the structure of the touch display circuit shown in FIG. 1, the embodiments of the present disclosure provide a driving method for the touch display circuit, correspondingly, the driving method comprises:

in a first stage, the driving module provides a first level to the touch unit, and the touch unit outputs a first amplified signal acquired by amplifying the first level to the signal collecting line;

in a second stage, when the touch unit is touched, the touch unit outputs the second amplified signal to the signal collecting line;

in a third stage, the driving module stores an operation voltage; and in a fourth stage, the touch unit is suspended, and the driving module applies the light-emitting signal to the light-emitting module under the operation voltage.

Further, when the touch unit included in the touch display circuit is the touch unit as illustrated in FIG. 2 or FIG. 3, that is, when the touch unit comprises the first switch transistor, the second switch transistor, the first capacitor and the amplifying transistor, the driving method further comprises:

in the first stage, the first switch transistor, the second switch transistor and the amplifying transistor of the touch unit are turned on, the driving module provides the first level to a source of the first switch transistor, a drain of the amplifying transistor outputs the first amplified signal to the signal collecting line through the second switch transistor;

in the second stage, the second switch transistor and the amplifying transistor of the touch unit are turned on, the first switch transistor is turned off, and the drain of the amplifying transistor outputs the second amplified signal to the signal collecting line through the second switch transistor when a second electrode of the first capacitor is touched;

in the third stage, the second switch transistor and the amplifying transistor of the touch unit are turned on, the first switch transistor is turned off, and the driving module stores the operation voltage; and in the fourth stage, the second switch transistor and the amplifying transistor of the touch unit are turned off, the first switch transistor is turned on, and the driving module applies the light-emitting signal to the light-emitting module.

Further, when the driving module included in the touch display circuit is the driving module as illustrated in FIG. 2 or FIG. 3, that is, when the driving module comprises the third switch transistor, the fourth switch transistor, the fifth switch transistor, the sixth switch transistor, the second capacitor and the driving transistor, the driving method further comprises:

in the first stage, the third switch transistor, the fourth switch transistor, the fifth switch transistor and the driving transistor of the driving module are turned on, the sixth switch transistor is turned off, the data line inputs a high level reset signal, and a first level terminal charges the second capacitor;

in the second stage, the fourth switch transistor, the fifth switch transistor and the driving transistor of the driving module are turned on, the third switch transistor and the sixth switch transistor are turned off, the second capacitor discharges until a voltage value at a second electrode of the second capacitor is equal to a threshold voltage of the driving transistor;

in the third stage, the sixth switch transistor and the driving transistor of the driving module are turned on, the third switch transistor, the fourth switch transistor and the fifth switch transistor are turned off, voltages at the two electrodes of the second capacitor jump equivalently, and the second capacitor stores the operation voltage; and in the fourth stage, the fourth switch transistor, the fifth switch transistor and the sixth switch transistor of the driving module are turned off, the third switch transistor is turned on, the second electrode of the second capacitor provides the operation voltage to the gate of the driving transistor so as to turn on the driving transistor, and the first level terminal and the second level terminal apply the light-emitting signal to the light-emitting module.

Further, when the light-emitting module as illustrated in FIG. 2 is utilized, the light-emitting module 21 comprises the seventh switch transistor T7 and the light-emitting device O1, and when a source and a drain of the seventh switch transistor T7 are connected with two electrodes of the light-emitting device O1 in parallel, the driving method further comprises:

the seventh switch transistor is turned on in the first stage;

the seventh switch transistor is turned on in the second stage;

the seventh switch transistor is turned on in the third stage; and the seventh switch transistor is turned off in the fourth stage, and the driving module provides the light-emitting signal to the light-emitting module through the first level terminal and the second level terminal.

Alternatively, when the light-emitting module as illustrated in FIG. 3 is utilized, the light-emitting module 21 comprises the seventh switch transistor T7 and the light-emitting device O1, and when the source and the drain of the seventh switch transistor T7 are connected with two electrodes of the light-emitting device O1 in series, the driving method further comprises:

the seventh switch transistor is turned off in the first stage;

the seventh switch transistor is turned off in the second stage;

the seventh switch transistor is turned off in the third stage; and the seventh switch transistor is turned on in the fourth stage, and the driving module provides the light-emitting signal to the light-emitting module through the first level terminal and the second level terminal.

Further, the first switch transistor, the second switch transistor, the third switch transistor, the fourth switch transistor, the fifth switch transistor, the sixth switch transistor, the driving transistor and the amplifying transistor may be the transistors with the same type.

Herein, a case where the first switch transistor T1, the second switch transistor T2, the third switch transistor T3, the fourth switch transistor T4, the fifth switch transistor T5, the sixth switch transistor T6, the seventh switch transistor T7, the amplifying transistor M1 and the driving transistor DTFT are all N-type transistor is described as an example. Referring to the circuit diagram illustrated in FIG. 2 and the exemplary view illustrating the signal timing states of FIG. 4, the driving method for the touch display circuit according to the embodiments of the present disclosure will be described below in details.

Figure 4:
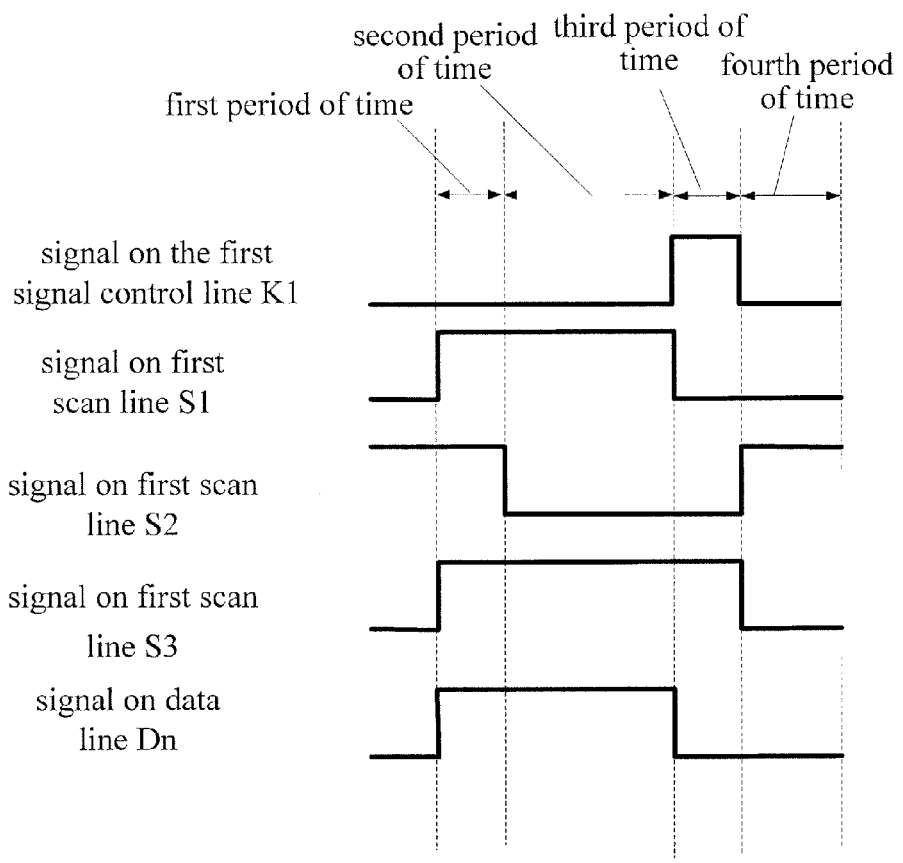
FIG. 4 is an exemplary view illustrating signal timing states of the touch display circuit shown in FIG. 2 according to the embodiments of the present disclosure.

In the first stage, namely a first period of time in the exemplary timing states chart of FIG. 4, the first signal control line K1 applies a low level signal, the first scan line S1, the second scan line S2, the third scan line S3 and the data line Dn apply high level signals, the first switch transistor T1 of the touch unit 1 is turned on, the third switch transistor T3 of the display unit 2 is turned on. At this time, a high level reset signal applied on the data line Dn charges the first capacitor C1, a voltage at one electrode of the first capacitor C1, which is the touch electrode (that is, the one which is connected with a node D in drawings) raises to Vg (of course, the Vg is large enough so that it may still provide a voltage signal greater than the threshold voltage of the amplifying transistor M1 after the voltage is changed when the touch electrode is touched), the absolute value of the difference between the gate voltage and the source voltage of the amplifying transistor M1 is greater than a turn-on threshold voltage $V_{th1}$ of the transistor, the first amplified signal is output to the signal collecting line, and the first amplified signal is as an initial reference amplified signal and is prepared for an occurring of touch by fingers in a next stage.

In the first stage, the third switch transistor T3, the fourth switch transistor T4, the fifth switch transistor T5 and the seventh switch transistor T7 of the display unit 2 are turned on, the sixth switch transistor T6 is turned off, the first level terminal V1 charges the second capacitor C2, and a voltage at a node A raises. During this process, a voltage at the second electrode of the second capacitor C2, namely the node A in drawings, is charged to be as same as the voltage at the first level terminal V1, at this time the voltage $V_A$ at the node A is equal to the voltage $V_1$ at the first level terminal V1; the first electrode of the second capacitor C2 is connected with the data line Dn, then the voltage at its second electrode, namely the voltage at a node B, is $V_B=V_{data}$ in which $V_{data}$ is a voltage value provided on the data line; similarly, if the display unit 21 as illustrated in FIG. 3 is utilized, the seventh switch transistor T7 is turned off at this time, then the organic light-emitting diode OLED is insulated, functions therein are as same as those in FIG. 2 and details are omitted herein.

Figure 5:
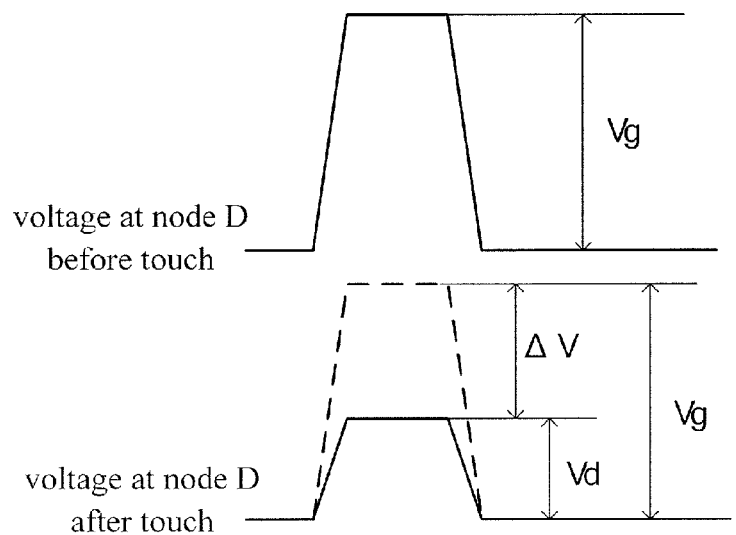
FIG. 5 is an exemplary view illustrating a variation in a voltage at a touch electrode of the touch display circuit according to the embodiments of the present disclosure.

In the second stage, namely a second period of time in the exemplary timing states chart of FIG. 4, the first scan line S1, the third scan line S3 and the data line Dn apply the high level signals, the second scan line S2 and the signal control line K1 apply the low level signals, the first switch transistor T1 of the touch unit 1 is turned off, the second switch transistor T2 and the amplifying transistor M1 are turned on. When the finger touches the touch electrode of the first capacitor C1 (that is, the second electrode of the first capacitor C1), a potential at a node D decreases. Referring to FIG. 5, because the Vg (that is, a voltage of the node D) is accumulated on the touch electrode as the first capacitor C1 is charged in the first stage, the voltage at the touch electrode may drop when the finger touches above the touch electrode N1, and the voltage subject to the dropping is Vd=Vg−ΔV as illustrated in FIG. 5. Of course a relationship of Vd≥$V_{th1}$ may be satisfied by controlling the manufacture processes for the touch electrode of the first capacitor and the amplifying transistor, in which $V_{th1}$ is the threshold voltage of the amplifying transistor M1; (that is to say, when the touch occurs, a minimum value of the absolute value of the difference between the gate voltage and the source voltage of the amplifying transistor M1 is greater than or equal to the turn-on threshold voltage $V_{th1}$ of the transistor, which may ensure that an amplified signal may be output on the signal collecting line L1 via the drain both in the first stage and in the second stage) at this time, the second amplified signal is output to the signal collecting line in the second stage because the voltage at the node D drops to Vd from the Vg in the first stage but the voltage difference between the gate and the source of the amplifying transistor M1 still satisfies a turn-on condition. Herein, a current of the second amplified signal after the touch occurs may be lower as compared with the first amplified signal.

At this time, a first coordinate direction may be determined by the second scan line S2, and a second coordinate direction which is perpendicular to the first coordinate direction may be determined by a variation value of the signal (the first amplified signal changes to the second amplified signal) output on the signal collecting line L1, thus a touch position may be located. Herein, the signal from the second scan line S2 is specified as a signal in a X axis coordinate direction, and the signal from the signal collecting line L1 is specified as a signal in a Y axis coordinate direction. When the first scan line S1 input a signal, a coordinate in the X axis direction is determined, and at this time, the amplifying transistor M1 may output a changed second amplified signal to the signal collecting line L1 since the second switch transistor T2 is turned on, so that coordinate positions on the two coordinate axes, namely the X axis and the Y axis, may be determined simultaneously when the variation in the signal on the signal collecting line L1 is detected, and thus the touch position is determined.

During this second stage, the fourth switch transistor T4, the fifth switch transistor T5 and the seventh switch transistor T7 of the display unit 2 are turned on, while the third switch transistor T3 and the sixth switch transistor T6 are turned off. Turning on of the seventh switch transistor T7 at this time still short-circuits the two terminal of the active light-emitting diode OLED, and the second capacitor C2 discharged until the voltage at the node A reaches the threshold voltage of the driving transistor DTFT; in this process, the second electrode of the second capacitor C2, namely the node A in drawings, starts to discharge until $V_A=V_{th2}$, in which $V_A$ is the gate voltage of the driving transistor DTFT, and at this time, $V_B=V_{data}$, in which $V_{data}$ is the voltage value provided on the data line, $V_{th2}$ is the threshold voltage of the driving transistor DTFT at this time, at last, the voltage at the node A becomes to $V_A=V_{th2}$. This stage is a compensation stage and functions as buffering to be prepared for the next stage. Similarly, if the display module 21 illustrated in FIG. 3 is utilized, the seventh switch transistor T7 is turned off at this time so as to insolate the active light-emitting diode OLED, its function is as same as that in FIG. 2 so details are omitted herein.

In the third stage, namely a third period of time in the exemplary timing states chart of FIG. 4, the first scan line S1, the second scan line S2 and the data line Dn apply the low levels, the signal control line K1 and the third scan line S3 apply the high levels, the first switch transistor T1 of the touch unit 1 is turned off, the second switch transistor T2 and the amplifying transistor M1 are turned on. The functions of the touch unit 1 in this stage are as same as those in the second stage so details are omitted herein. That is to say, the touch sensing also may be performed in the third stage, so that a probability of time capable of collecting the touch sensing may be increased during the entire period of time, and in turn an accuracy of the touch scan is increased.

During this third stage, the third switch transistor T3, the fourth switch transistor T4 and the fifth switch transistor T5 of the display unit 2 are turned off, the sixth switch transistor T6, the seventh switch transistor T7 and the driving transistor DTFT are turned on. At this time, the turning on of the seventh switch transistor T7 still short-circuits the two terminal of the active light-emitting diode OLED, and the node B is connected to the first level terminal V1. At this time, since the node A is float, the voltages at the nodes A, B jump equivalently, namely the voltage at the node B is $V_B=V_1$, and the voltage at the node A is $V_A=V_1+V_{th2}-V_{data}$, which are prepared for the light-emitting in the next stage. Similarly, if the display module 21 illustrated in FIG. 3 is utilized, the seventh switch transistor T7 is turned off at this time so as to insolate the active light-emitting diode OLED, its function is as same as that in FIG. 2 so details are omitted herein. In can be understood that the voltage at the node A is the operation voltage stored by the driving module, namely a threshold compensation voltage for avoiding the shift of the threshold voltage of the driving transistor. Of course, there is no limitation on the operation voltage stored by the driving module, as long as it can ensure a voltage for turning on the driving transistor.

In the fourth stage, namely a fourth period of time in the exemplary timing states chart of FIG. 4, the first scan line S1, the third scan line S3, the signal control line K1 and the data line Dn apply the low level signals, the second scan line S2 applies the high level signal, the touch unit 1 is in a suspended stage, and the signal collecting line L1 outputs no signals because the second switch transistor T2 is turned off.

During this fourth stage, the third switch transistor T3 of the display unit 2 is turned on while other switch transistors are turned off, and the first level terminal V1 and the second level terminal V2 apply the turn-on signal to the light-emitting device O1. similarly, if the display module 22 illustrated in FIG. 3 is utilized, the seventh switch transistor 17 is turned on at this time so that the first level terminal V1 and the second level terminal V2 apply the turn-on signal to the light-emitting device O1, its function is as same as that in FIG. 2 so details are omitted herein. During this process, the active light-emitting device starts to emit light, and its driving current follows an equation as follows:

$$I_{OLED} = K[V_{GS} - V_{th2}]^2 = K[V_1 + V_{th2} - V_{data} - V_1 - V_{th2}]^2 = K \cdot V_{data}^2.$$

It can be seen from the above equation that the driving current $I_{OLED}$ only relates to the voltage $V_{data}$ on the data line, therefore can not be affected by $V_{th2}$, in which $V_{GS}$ is a voltage across a gate and a source of a TFT, $$K = \frac{1}{2} \mu C_{ox} \frac{W}{L},$$

$\mu$ and $C_{ox}$ are process constants, W is a channel width of the TFT, L is a channel length of the TFT, and both of the W and L are constants which may be designed selectively.

Above descriptions are made by taking a case where the light-emitting device is the bottom-emission type OLED as an example, that is, the level of the first level terminal is higher than that of the second level terminal. Further, it can be conceive that the second level terminal may be connected with the low level of the ground terminal directly when the light-emitting device is the bottom-emission type OLED, that is, a negative electrode of the OLED is connected with the ground terminal, so that the design difficulty of the circuit may be reduced, which is more convenient for a layout of the circuit. Of course, the above embodiments are also described based on a case where the second level terminal V2 is connected with the ground terminal.

The above embodiments are illustrated by taking a case where all of the first switch transistor T1, the second switch transistor T2, the third switch transistor T3, the fourth switch transistor T4, the fifth switch transistor T5, the sixth switch transistor T6, the seventh switch transistor T7, the amplifying transistor M1 and the driving transistor DTFT are N-type switch transistors. Obviously, utilization of all N-type switch transistors in the process of the display apparatus may be benefit to reduce the manufacture processes and ensure the unity of the device performances. Herein, superiorities of a LTPS process are reflected in that a transistor device formed by such process may further have a high breakdown voltage for the amplifying transistor M1, besides its high mobility speed of carriers (a size of the transistor may be manufactured as being small to enhance the aperture ratio).

No limitations are made to the types of the respective switch transistors described above, either the N-type or the P-type is applicable. FIG. 1 makes a description by taking a case in which all of the switch transistors are N-type as an example, but of course the type may be changed suitably, and the signals on the signal lines connected to the corresponding gates are needed to be adjusted after the types of the corresponding switch transistors are changed. Such variations should be considered as to fall into the scope sought for protection by the present disclosure. Those skilled in the art may easily think that the gates of the T1-T7 may be also controlled by separate signal lines because the T1 and T3 share the second scan line S2, the T4 and T5 share the first scan line S1, and the T2 and T7 share the third scan line S3, but the manner of sharing the signal scan lines for the gates of the switch transistors in the embodiments of the present disclosure facilitates to reduce the design difficulty of the wirings and may ensure the aperture ratio of the display panel. In other words, the embodiments of the present disclosure make no limitations on the types of the respective switch transistors, as long as the corresponding signal lines or the level signal applied on the corresponding signal lines are adjusted correspondingly when the types of the switch transistors are adjusted, but an implementability of the driving method for the touch display circuit according to the embodiments of the present disclosure should be ensured. Any other combination thought and realized by those skilled in the art easily based on the driving method for the touch display circuit according to the embodiments of the present disclosure fall into the scope sought for protection by the present disclosure.

In the driving method for the touch display circuit according to the embodiments of the present disclosure, the circuit with a touch structure and the circuit of the display unit are integrated into together, therefore the touch structure according to the embodiments of the present disclosure may be manufactured simultaneously by the manufacture process for the display unit, which may reduce the process during the production procedure of the touch display product, saving the cost while increasing the aperture ratio of the produce and added values. Furthermore, the display unit may avoid an influence on a driving current of the active light-emitting device caused by a shift of the threshold voltage of the driving transistor in a manner of voltage compensation, which may in turn an uniformity of displayed image.

In one aspect, there is provided an array substrate comprising any one of the touch display circuits described above.

In the array substrate according to the embodiments of the present disclosure, the circuit with a touch structure and the circuit of the display unit are integrated into together, therefore the touch structure according to the embodiments of the present disclosure may be manufactured simultaneously by the manufacture process for the display unit, which may reduce the process during the production procedure of the touch display product, saving the cost while increasing the aperture ratio of the produce and added values. Furthermore, the display unit may avoid an influence on a driving current of the active light-emitting device caused by a shift of the threshold voltage of the driving transistor in a manner of voltage compensation, which may in turn an uniformity of displayed image.

In one aspect, there is provided a display apparatus comprising the array substrate described above. Further, the display apparatus also may be other display devices, such as a piece of electronic paper, a mobile phone, a TV, a digital photo frame and the like.

In the display apparatus according to the embodiments of the present disclosure, the circuit with a touch structure and the circuit of the display unit are integrated into together, therefore the touch structure according to the embodiments of the present disclosure may be manufactured simultaneously by the manufacture process for the display unit, which may reduce the process during the production procedure of the touch display product, saving the cost while increasing the aperture ratio of the produce and added values. Furthermore, the display unit may avoid an influence on a driving current of the active light-emitting device caused by a shift of the threshold voltage of the driving transistor in a manner of voltage compensation, which may in turn an uniformity of displayed image.

The above descriptions only illustrate the specific embodiments of the present invention, and the protection scope of the present invention is not limited to this. Given the teaching as disclosed herein, variations or substitutions, which can easily occur to any skilled pertaining to the art, should be covered by the protection scope of the present invention. Thus, the protection scope of the present invention is defined by the claims.

What is claimed is:

1. A touch display circuit comprising a touch unit and a display unit which are connected with each other; a first scan line, a second scan line, a third scan line, a signal control line, a data line, a first level terminal and a second level terminal, which are connected with the display unit; and the second scan line, the third scan line and a signal collecting line, which are connected with the touch unit; the display unit comprises a driving module and a light-emitting module; the driving module is connected with the first scan line, the second scan line, the signal control line, the data line, the first level terminal and the touch unit; the light-emitting module is connected with the driving module, the third scan line and the second level terminal; wherein the driving module provides a first voltage level to the touch unit under controls of the first scan line, the second scan line, the signal control line and the data line; the touch unit outputs a first amplified signal acquired by amplifying the first voltage level to the signal collecting line, or the touch unit outputs a second amplified signal to the signal collecting line as touched; the driving module provides a light-emitting signal to the light-emitting module through the first level terminal and the second level terminal under the controls of the first scan line, the second scan line, the signal control line and the data line; and the third scan line controls the light-emitting signal so as to drive the light-emitting module to emit light.

2. The touch display circuit of claim 1, wherein the touch unit comprises a first switch transistor, a second switch transistor, a first capacitor and an amplifying transistor;
a gate of the first switch transistor is connected with the second scan line, and a source thereof is connected with the driving module of the display unit;
a gate of the amplifying transistor is connected with a drain of the first switch transistor, and a source of the amplifying transistor is connected with a first electrode of the first capacitor;
a second electrode of the first capacitor, as a touch electrode, is connected with the drain of the first switch transistor, and the first electrode of the first capacitor is connected with a ground terminal; and
a gate of the second switch transistor is connected with the third scan line, a source of the second switch transistor is connected with a drain of the amplifying transistor, and a drain of the second switch transistor is connected with the signal collecting line.

3. The touch display circuit of claim 2, wherein the driving module comprises a second capacitor, a driving transistor, a third switch transistor, a fourth switch transistor, a fifth switch transistor and a sixth switch transistor;
a gate of the third switch transistor is connected with the second scan line, and a source of the third switch transistor is connected with the first level terminal;
a gate of the fourth switch transistor is connected with the first scan line, and the source of the fourth switch transistor is connected with a drain of the third switch transistor;
a gate of the fifth switch transistor is connected with the first scan line, a source of the fifth switch transistor is connected with the data line, and a drain of the fifth switch transistor is connected with the touch unit;
a first electrode of the second capacitor is connected with the drain of the fifth switch transistor, and a second electrode of the second capacitor is connected with a drain of the fourth switch transistor;
a gate of the sixth switch transistor is connected with the signal control line, a source of the sixth switch transistor is connected with the first level terminal, and a drain of the sixth switch transistor is connected with the drain of the fifth switch transistor;
a gate of the driving transistor is connected with the second electrode of the second capacitor, and a source of the driving transistor is connected with the drain of the third switch transistor; and
a drain of the driving transistor is connected with the light-emitting module, the first level terminal provides the light-emitting signal to the light-emitting module through the drain of the driving transistor and the second level terminal, and the third scan line controls the light-emitting signal so as to drive the light-emitting module to emit light.

4. The touch display circuit of claim 3, wherein the light-emitting module comprises a seventh switch transistor and a light-emitting device;
a gate of the seventh switch transistor is connected with the third scan line, a source of the seventh switch transistor is connected with the driving module, and a drain of the seventh switch transistor is connected with the second level terminal; and
one electrode of the light-emitting device is connected with the drain of the driving transistor, and the other electrode of the light-emitting device is connected with the second level terminal.

5. The touch display circuit of claim 3, wherein the light-emitting module comprises a seventh switch transistor and a light-emitting device;
a gate of the seventh switch transistor is connected with the third scan line, and a source of the seventh switch transistor is connected with the driving module; and
one electrode of the light-emitting device is connected with a drain of the seventh switch transistor, and the other electrode of the light-emitting device is connected with the second level terminal.

6. The touch display circuit of claim 2, wherein all of the transistors in the touch display circuit are transistors with a same type.

7. A driving method for a touch display circuit, comprising:
in a first stage, a driving module provides a first voltage level to a touch unit, and the touch unit outputs a first amplified signal acquired by amplifying the first voltage level to a signal collecting line;
in a second stage, the touch unit is touched, and the touch unit outputs a second amplified voltage signal to the signal collecting line;
in a third stage, the driving module stores an operation voltage; and
in a fourth stage, the touch unit is suspended, and the driving module applies a light-emitting signal to a light-emitting module under the operation voltage.

8. The driving method of claim 7, wherein the touch unit comprises a first switch transistor, a second switch transistor, a first capacitor and an amplifying transistor, the driving method further comprises: in the first stage, the first switch transistor, the second switch transistor and the amplifying transistor of the touch unit are turned on, the driving module provides the first voltage level to a source of the first switch transistor, a drain of the amplifying transistor outputs the first amplified signal to the signal collecting line through the second switch transistor; in the second stage, the second switch transistor and the amplifying transistor of the touch unit are turned on, the first switch transistor is turned off, and the drain of the amplifying transistor outputs the second amplified signal to the signal collecting line through the second switch transistor when a second electrode of the first capacitor is touched; in the third stage, the second switch transistor and the amplifying transistor of the touch unit are turned on, the first switch transistor is turned off, and the driving module stores the operation voltage; and in the fourth stage, the second switch transistor and the amplifying transistor of the touch unit are turned off, the first switch transistor is turned on, and the driving module applies the light-emitting signal to the light-emitting module.

9. The driving method of claim 8, wherein the driving module comprises a third switch transistor, a fourth switch transistor, a fifth switch transistor, a sixth switch transistor, a second capacitor and a driving transistor, the driving method further comprises:
  in the first stage, the third switch transistor, the fourth switch transistor, the fifth switch transistor and the driving transistor of the driving module are turned on, the sixth switch transistor is turned off, the data line inputs a high level reset signal, and a first level terminal charges the second capacitor;
  in the second stage, the fourth switch transistor, the fifth switch transistor and the driving transistor of the driving module are turned on, the third switch transistor and the sixth switch transistor are turned off, the second capacitor discharges until a voltage value at a second electrode of the second capacitor is equal to a threshold voltage of the driving transistor;
  in the third stage, the sixth switch transistor and the driving transistor of the driving module are turned on, the third switch transistor, the fourth switch transistor and the fifth switch transistor are turned off, voltages at the two electrodes of the second capacitor jump equivalently, and the second capacitor stores the operation voltage; and
  in the fourth stage, the fourth switch transistor, the fifth switch transistor and the sixth switch transistor of the driving module are turned off, the third switch transistor is turned on, the second electrode of the second capacitor provides the operation voltage to the gate of the driving transistor so as to turn on the driving transistor, and the first level terminal and the second level terminal apply the light-emitting signal to the light-emitting module.

10. The driving method of claim 9, wherein the light-emitting module comprises a seventh switch transistor and a light-emitting device, and when a source and a drain of the seventh switch transistor are connected with two electrodes of the light-emitting device in parallel, the driving method further comprises:
  the seventh switch transistor is turned on in the first stage;
  the seventh switch transistor is turned on in the second stage;
  the seventh switch transistor is turned on in the third stage; and
  the seventh switch transistor is turned off in the fourth stage, and the driving module provides the light-emitting signal to the light-emitting module through the first level terminal and the second level terminal.

11. The driving method of claim 9, wherein the light-emitting module comprises a seventh switch transistor and a light-emitting device, and when a source and a drain of the seventh switch transistor are connected with two electrodes of the light-emitting device in series, the driving method further comprises:
  the seventh switch transistor is turned off in the first stage;
  the seventh switch transistor is turned off in the second stage;
  the seventh switch transistor is turned off in the third stage; and
  the seventh switch transistor is turned on in the fourth stage, and the driving module provides the light-emitting signal to the light-emitting module through the first level terminal and the second level terminal.

12. An array substrate comprising a touch display circuit, the touch display circuit comprising a touch unit and a display unit which are connected with each other; a first scan line, a second scan line, a third scan line, a signal control line, a data line, a first level terminal and a second level terminal, which are connected with the display unit; and the second scan line, the third scan line and a signal collecting line, which are connected with the touch unit; the display unit comprises a driving module and a light-emitting module; the driving module is connected with the first scan line, the second scan line, the signal control line, the data line, the first level terminal and the touch unit; the light-emitting module is connected with the driving module, the third scan line and the second level terminal; wherein the driving module provides a first voltage level to the touch unit under controls of the first scan line, the second scan line, the signal control line and the data line; the touch unit outputs a first amplified signal acquired by amplifying the first voltage level to the signal collecting line, or the touch unit outputs a second amplified signal to the signal collecting line as touched; the driving module provides a light-emitting signal to the light-emitting module through the first level terminal and the second level terminal under the controls of the first scan line, the second scan line, the signal control line and the data line; and the third scan line controls the light-emitting signal so as to drive the light-emitting module to emit light.

13. The array substrate of claim 12, wherein the touch unit comprises a first switch transistor, a second switch transistor, a first capacitor and an amplifying transistor;
  a gate of the first switch transistor is connected with the second scan line, and a source thereof is connected with the driving module of the display unit;
  a gate of the amplifying transistor is connected with a drain of the first switch transistor, and a source of the amplifying transistor is connected with a first electrode of the first capacitor;
  a second electrode of the first capacitor, as a touch electrode, is connected with the drain of the first switch transistor, and the first electrode of the first capacitor is connected with a ground terminal; and
  a gate of the second switch transistor is connected with the third scan line, a source of the second switch transistor is connected with a drain of the amplifying transistor, and a drain of the second switch transistor is connected with the signal collecting line.

14. The array substrate of claim 13, wherein the driving module comprises a second capacitor, a driving transistor, a third switch transistor, a fourth switch transistor, a fifth switch transistor and a sixth switch transistor;
- a gate of the third switch transistor is connected with the second scan line, and a source of the third switch transistor is connected with the first level terminal;
- a gate of the fourth switch transistor is connected with the first scan line, and the source of the fourth switch transistor is connected with a drain of the third switch transistor;
- a gate of the fifth switch transistor is connected with the first scan line, a source of the fifth switch transistor is connected with the data line, and a drain of the fifth switch transistor is connected with the touch unit;
- a first electrode of the second capacitor is connected with the drain of the fifth switch transistor, and a second electrode of the second capacitor is connected with a drain of the fourth switch transistor;
- a gate of the sixth switch transistor is connected with the signal control line, a source of the sixth switch transistor is connected with the first level terminal, and a drain of the sixth switch transistor is connected with the drain of the fifth switch transistor;
- a gate of the driving transistor is connected with the second electrode of the second capacitor, and a source of the driving transistor is connected with the drain of the third switch transistor; and
- a drain of the driving transistor is connected with the light-emitting module, the first level terminal provides the light-emitting signal to the light-emitting module through the drain of the driving transistor and the second level terminal, and the third scan line controls the light-emitting signal so as to drive the light-emitting module to emit light.

15. The array substrate of claim 14, wherein the light-emitting module comprises a seventh switch transistor and a light-emitting device;
- a gate of the seventh switch transistor is connected with the third scan line, a source of the seventh switch transistor is connected with the driving module, and a drain of the seventh switch transistor is connected with the second level terminal; and
- one electrode of the light-emitting device is connected with the drain of the driving transistor, and the other electrode of the light-emitting device is connected with the second level terminal.

16. The array substrate of claim 14, wherein the light-emitting module comprises a seventh switch transistor and a light-emitting device;
- a gate of the seventh switch transistor is connected with the third scan line, and a source of the seventh switch transistor is connected with the driving module; and
- one electrode of the light-emitting device is connected with a drain of the seventh switch transistor, and the other electrode of the light-emitting device is connected with the second level terminal.

17. The array substrate of claim 13, wherein all of the transistors in the touch display circuit are transistors with a same type.

* * * * *